May 17, 1932.   E. J. SCHNEIDER   1,858,791
SLICING MACHINE
Filed Feb. 27, 1930
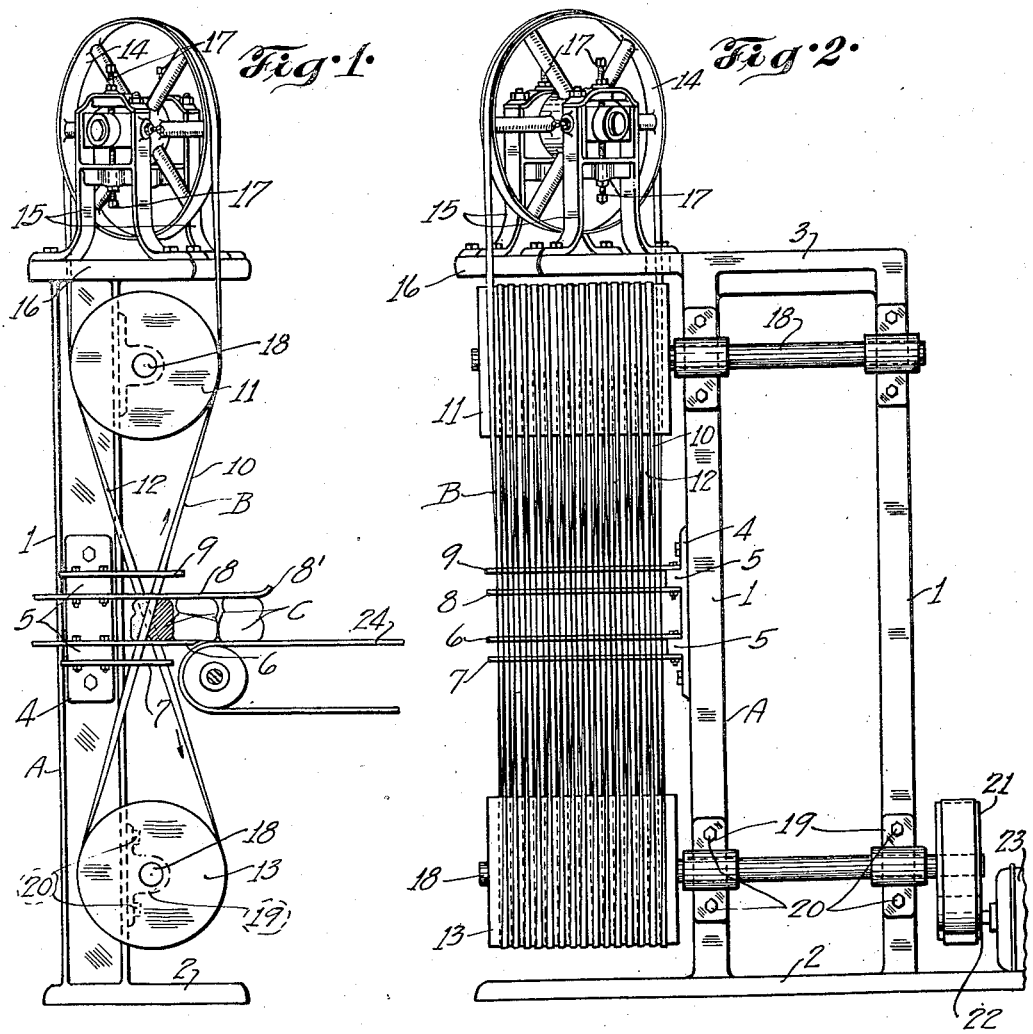
INVENTOR
Edward J. Schneider.
By
ATTORNEY Patented May 17, 1932

1,858,791

UNITED STATES PATENT OFFICE

EDWARD J. SCHNEIDER, OF ST. LOUIS, MISSOURI, ASSIGNOR TO PAPENDICK, INC., OF ST. LOUIS, MISSOURI, A CORPORATION OF MISSOURI

SLICING MACHINE

Application filed February 27, 1930. Serial No. 431,729.

This invention relates generally to slicing machines and, more particularly, to a certain new and useful improvement in machines especially adapted for the slicing of baked loaf bread and the like.

My invention has for its chief object the provision of a slicing machine adapted and designed to rapidly and efficiently cut or divide the baked loaves into approximately uniform slices and so constructed and operable as to preserve the sliced loaf or the like substantially in its pre-sliced shape and contour.

My invention has for another object the provision of a machine of the type stated in which the slicing members comprise a plurality of pairs of relatively narrow or ribbon-like crossed bands, the bands of each pair being adapted for obliquely engaging a loaf in opposed directions and in spaced slice-defining relation, the pairs of bands forming component parts of a suitably elongated endless blade reeved through the machine and so disposed as to provide a relatively clear, unobstructed feeding throat for bringing the loaves to be sliced to and through the slicing members at approximately the plane of crossing of the several pairs thereof.

My invention has for a further object the provision of a machine of the type stated in which the slicing blade may be tensioned in a simple, convenient, and effective manner, and in which the slicing blade is also characterized by being singularly accessible for inspection, maintenance, and repair.

My invention has for a still further object to provide a slicing machine which is simple and relatively inexpensive in construction, compact and durable in structure, and efficient in the performance of its intended purposes and functions.

And with the above and other objects in view, my invention resides in the novel features of form, construction, arrangement, and combination of parts hereinafter described and pointed out in the claims.

In the accompanying drawings,—

Figure 1 is a side elevational view of a slicing machine embodying my invention, shown in connection with the terminal portion of a feeding mechanism and loaves to be sliced, one of the latter being shown in section; and Figure 2 is a front elevational view of the machine, the feeding mechanism and loaves to be sliced being omitted, and parts being broken away.

Referring now more in detail and by reference characters to the drawings, which illustrate a preferred embodiment of my invention, A designates the frame of the machine which preferably includes a pair of suitably spaced standards 1 upstanding from a floorplate or base 2 and united at their tops by a cross-piece 3.

Supported intermediately on one of the standards 1, is a bracket 4 provided with a pair of spaced laterally presented lugs 5, which rigidly support a plurality of transverse shelf-like members disposed preferably in pairs, as shown, the lower pair being suitably spaced downwardly from and disposed under the upper pair and comprising a relatively broad flatwise-disposed comb-like member 6 constituting what might be designated a work-table for the loaves to be sliced and a comb-like guide-member 7, in turn, suitably spaced downwardly from the work-table 6. The upper pair of said members preferably comprises another relatively broad flatwise disposed comb-like member 8 having a plurality of forwardly disposed relatively resilient fingers 8' presented upwardly somewhat in advance of the forward longitudinal edge of the work-table 6 therebelow and constituting what might well be designated a combined guide and holding-member for the loaves to be sliced, and a second comb-like guide-member 9 suitably spaced upwardly from the member 8.

The slicing means proper of the machine includes a blade B in the form preferably of a continuous, endless ribbon-like band reeved in a helicoidal manner through the machine to integrally comprise a series of ascending strands or cutting-members 10 each traveling obliquely upwardly and forwardly and then rearwardly over an upper rotary drum 11, and an alternating series of descending strands or cutting-members 12 each similarly traveling from the drum 11 obliquely downwardly and also forwardly and then rearwardly under an opposed or lower rotary drum 13. Thus the endless-knife B integrally or as a unit provides a plurality of pairs of the strands 10, 12, the strands 10, 12, of each pair crossing in laterally spaced relation approximately midway intermediate the drums 11, 13. Each strand 10, 12, is also suitably twisted upon itself intermediate the drums 11, 13, and approximately at the point of crossing, so as to present a side or cutting edge in the line or path of travel of the loaves C to be sliced.

Such lateral spacing of the alternating strands 10, 12, at approximately the point of crossing thereof is preferably regulated and accomplished by providing the comb-like members 6, 7, 8, 9, each with a longitudinal series of transverse slots opening at and extending inwardly from the front edge thereof, said respective members 6, 7, 8, 9, being arranged in such manner that a slot in one vertically aligns or registers with a slot in each of the others, each such group of vertically aligned slots being adapted for slidding reception of one of the traveling strands 10, 12, in guiding and laterally supporting relation thereto. Thus also a feed-throat is provided between the work-table 6 and the superposed guard 8 substantially at the point of crossing, and substantially in the plane of parallelism, of the twisted strands 10, 12.

In reeving the continuous band or knife B over the opposed drums 11, 13, the respective strands 10, 12, are each twisted preferably a half turn in such manner that at its point of tangency with the drums each strand is parallel transversely of its width with the faces of the drum, but at a point intermediate thereof the respective strands are perpendicular transversely of their width to the faces of the drums 11, 13, and readily run through the particular group of vertically aligned slots in the work-table 6, guides 7, 9, and guard 8, the effect being to vertically present a cutting edge of each strand for slicing engagement with the loaves C being sliced.

It will be noted that each strand 10, 12, is normally inclined slightly from the vertical due to the helicoidal arrangement of the band B over the drums 11, 13, and in such regard the slotted guides 7, 9, in co-operation with the slotted work-table 6 and guard 8, function both to vertically retain the respective strands with respect to the work for forming parallel slices thereof and also suitably space the several strands so as to uniformly define the width of the cut slices.

For returning the strand of the band B departing from one end of the lower drum 13 to the opposite end thereof, an obliquely disposed so-called shiftable tensioning pulley 14 is adjustably supported, as soon appearing, in co-operative belt-directing relation with the drum 13 therebelow, in such manner as to lead or directingly engage the returning portion of the belt B twistingly upwardly from one end and side of the drum 13 twistingly downwardly to the opposite end and side of said drum, whereby the band B is caused to repeat its spirally looped course along the drums 11, 13.

The tensioning pulley 14 is preferably journaled in a pair of standard four-point adjustable bearings 15 mounted upon a suitable shelf-like bracket 16 presented outwardly from the adjacent frame-standard 1. The bearings 15 are of common type and hence detail description thereof is here omitted; I would state, however, that by manipulating the adjusting screws 17, the axis of the pulley 14 may be swung in any direction suitably for the purposes intended.

The drums 11, 13, are mounted on respective arbor-shafts 18, 18, each journaled in respective pairs of transversely-aligned bearings 19 suitably secured to the frame standards 1, as by fastening elements 20. The lower shaft 18 may be extended at an end to provide support for a suitable pulley 21 preferably of the friction type for co-operative or driving connection with a pulley 22 adapted for actuation by a prime-mover, as an electric motor 23, which, for present purposes, may be supported on the base 2 of the frame of the machine.

In use and operation, the oppositely moving strands 10, 12, are arranged in a helicoidal direction in such manner as to present to the loaves C to be sliced a series of cutting edges approaching the work-table 6 from above and alternate series of cutting edges interfitted in crossing relation with the first series and approaching the work-table 6 from below, the spacing between the several oppositely moving cutting strands 10, 12, being regulated by the slotted plates 6, 7, 8, and 9 proportioned suitably to the thickness of the slices to be cut, the endless band-knife B being reeved or wound around the drums 11, 13, as many turns as are required to properly slice the loaves C.

It will readily be seen that a loaf C is engaged on one side by an upwardly moving strand, tending to lift the loaf, and on the other side the sliced portion is engaged by a downwardly moving strand tending to neutralize the first trend, whereby the slice is caused to remain in approximately its presliced position during the slicing operation. In such respect, the guard 8 co-operates with the work-table 6 to form a relatively unobstructed feeding throat, the guard 8 being selectively set at such distance from the plate 6 to prevent vertical displacement of the loaf while permitting the same to be fed to and through the series of cutting strands 10, 12.

As an example of the use of the invention, the same is shown in connection with the terminal portion of a feeding mechanism 24, the successively discharged baked loaves C being first yieldingly engaged by the resilient guard-finders 8' and then engaged by and between the work-table 6 and guard 8 for the slicing operation, the loaves C passing to, between, and through the series of spaced slicing strands 10, 12, for discharge therefrom in sliced condition substantially in the shape and contour of the pre-sliced loaf. As will be noted, one of the loaves C is shown in section in engagement with a pair of the cutting strands 10, 12, and it will be observed that the strands of said pair cut oppositely obliquely in spaced vertical planes upon the loaf-body.

The several slicing strands 10, 12, run constantly in their respective degrees and directions, the effect being to confine the actual engagement of the cutting elements with the baked-loaves to a relatively narrow band moving in a constant direction and speed. In practice it has been found that the relatively soft tissues of a baked loaf may thus be sliced cleanly and neatly with minimum crumb or débris formation and in such manner as to substantially avoid crushing, tearing, or bunching the tissues being cut.

Training of the band-knife B spirally over the rolls or drums 11, 13, provides, in effect, a continuing series of conjoined twisted loops, the strands 10, 12, of which may be cooperatively arranged in a more or less closely spaced group suitably for cutting relatively thin slices in the loaves, the loops being twisted for presenting a sharpened edge of the band successively to and along the work. The thickness of the respective slices of the sliced loaf may be conveniently governed by varying the spacing of the registering slots in the plates 6, 7, 8, and 9, the tensioning pulley 14 being correspondingly swiveled or adjusted for cooperatively receiving and returning the band B from and to the pulley 13.

It will be noted further that the band-knife B may be tensioned by suitably adjusting the wheel 14, and the co-operative comb-like members 6, 7, 8, and 9 serve as spacing means for supporting the cutting strands 10, 12, when the same are under strain from thrust of the work against the cutting edges to keep said band-like strands from buckling.

The machine is of simple and highly suitable construction for the purposes intended, particularly with respect to the manner in which the feeding throat of the machine is well away from the actuating mechanism, thus providing a relatively clear, open space at the cutting zone, which in large measure prevents contamination of the loaves C being sliced with oil or other foreign matter that may be thrown off by said actuating means.

It is to be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A slicing machine comprising a pair of spaced rotary drums, a blade in the form of an endless band reeved in a helicoidal manner about said drums to comprise a plurality of pairs of cutting-members traveling intermediate and over said drums, and means including an adjustable pulley for tensioning said blade, the blade passing from one end of one of the drums to and over the pulley and then returning to the opposite end of said one drum.

2. A slicing machine including a frame, a pair of rotary drums mounted in spaced relation in the frame, a blade in the form of an endless band reeved in a helicoidal manner about said drums to integrally comprise opposed alternating series of ascending and descending ribbon-like strands adapted in crossed pair relation to oppositely travel obliquely from one drum to the other, a pair of plates fixed to the frame intermediate the drums and provided with vertically registering series of strand-accommodating slots for spacing the strands for edgewise cutting engagement with the work in slice-defining relation, and means for actuating the blade.

3. A slicing machine including a frame, a pair of rotary drums mounted in spaced relation upon the frame, a blade in the form of an endless band reeved in a helicoidal manner about said drums to integrally comprise opposed alternating series of ascending and descending ribbon-like strands adapted in crossed pair relation to oppositely travel obliquely from one drum to the other, a pair of horizontally disposed plates fixed to the frame in spaced relation intermediate the drums providing a feeding throat for the work to and through the strands approximately in the plane of crossing thereof, a second pair of plates also fixed to the frame intermediate the drums and disposed in spaced relation upon opposite sides of the first plates for spacing the strands for edgewise cutting engagement with the work in slice-defining relation, said pairs of plates having vertically registering series of strand-accommodating slots, and means for actuating the blade.

4. A slicing machine including a frame, a pair of rotary drums mounted in spaced relation upon the frame, a blade in the form of an endless band reeved in a helicoidal manner about said drums to integrally comprise opposed alternating series of ascending and descending ribbon-like strands adapted in crossed pair relation to oppositely travel obliquely from one drum to the other, a pair of horizontally disposed plates fixed to the frame in spaced relation intermediate the drums providing a feeding throat for the work to and through the strands approximately in the plane of crossing thereof, a second pair of plates also fixed to the frame intermediate the drums and disposed in spaced relation upon opposite sides of the first plates for spacing the strands for edgewise cutting engagement with the work in slice-defining relation, said pairs of plates having vertically registering series of strand-accommodating slots, and means for actuating the blade, said means including a driving-shaft for one of said drums, an extension on said shaft, and a prime-mover having operative connection with said extension.

5. A slicing machine comprising a frame, a pair of rotary drums mounted in spaced relation upon the frame, a blade in the form of an endless band, and a directing pulley mounted on the frame over the drums, the band passing from one end of one of the drums over and around the pulley and returning to the opposite end of said one drum and being reeved in a helicoidal manner about the drums to integrally comprise alternating series of ascending and descending strands traveling over and obliquely between the drums, and means for actuating the blade.

In testimony whereof, I have signed my name to this specification.

EDWARD J. SCHNEIDER.